US009036038B2

(12) United States Patent
Kimura

(10) Patent No.: US 9,036,038 B2
(45) Date of Patent: May 19, 2015

(54) INFORMATION PROCESSING APPARATUS AND METHOD FOR EXTRACTING AND CATEGORIZING POSTURES OF HUMAN FIGURES

(75) Inventor: Jun Kimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 742 days.

(21) Appl. No.: 13/045,155

(22) Filed: Mar. 10, 2011

(65) Prior Publication Data

US 2011/0234854 A1 Sep. 29, 2011

(30) Foreign Application Priority Data

Mar. 29, 2010 (JP) ................. P2010-076304

(51) Int. Cl.
*H04N 5/228* (2006.01)
*H04N 5/232* (2006.01)
*G06K 9/00* (2006.01)

(52) U.S. Cl.
CPC ........ *H04N 5/23219* (2013.01); *G06K 9/00369* (2013.01)

(58) Field of Classification Search
USPC ...................................... 348/222.1
See application file for complete search history.

(56) References Cited

U.S. PATENT DOCUMENTS

| 7,483,057 | B2 * | 1/2009 | Grosvenor et al. | 348/211.9 |
| 7,613,324 | B2 * | 11/2009 | Venetianer et al. | 382/103 |
| 7,990,421 | B2 * | 8/2011 | Thorn | 348/211.99 |
| 2004/0098144 | A1 * | 5/2004 | Hashimoto et al. | 700/27 |
| 2007/0009135 | A1 * | 1/2007 | Ishiyama | 382/103 |
| 2007/0279494 | A1 * | 12/2007 | Aman et al. | 348/169 |
| 2008/0089587 | A1 * | 4/2008 | Kim et al. | 382/190 |
| 2008/0112592 | A1 * | 5/2008 | Wu et al. | 382/103 |
| 2010/0073497 | A1 * | 3/2010 | Katsumata et al. | 348/211.99 |
| 2010/0149343 | A1 * | 6/2010 | Kim et al. | 348/169 |

FOREIGN PATENT DOCUMENTS

| JP | 2005-051472 A | 2/2005 |
| JP | 2008-263422 | 10/2008 |

OTHER PUBLICATIONS

Office Action received for Chinese patent application No. 201110074081.6, Mailed on Dec. 1, 2014.

* cited by examiner

*Primary Examiner* — Nelson D. Hernández Hernández
(74) *Attorney, Agent, or Firm* — Hazuki International, LLC

(57) ABSTRACT

An information processing apparatus includes an image pickup unit, an extracting unit, an estimating unit, a categorizing unit, and a recording control unit. The image pickup unit captures an image of a subject. The extracting unit extracts a human figure from the captured image of the subject captured by the image pickup unit. The estimating unit estimates a posture of the human figure extracted by the extracting unit. The categorizing unit categorizes the posture of the human figure estimated by the estimating unit into a previously prepared pose. The recording control unit controls recording of the captured image on the basis of the pose that the posture of the human figure is categorized into by the categorizing unit.

14 Claims, 11 Drawing Sheets

FIG. 5

| POSE | J1 | J2 | ... | J10 |
|---|---|---|---|---|
| POSE OF THRUSTING ONE'S FIST | (xa1, ya1, za1) | (xa2, ya2, za2) | ... | (xa10, ya10, za10) |
| POSE OF RAISING ARMS | (xb1, yb1, zb1) | (xb2, yb2, zb2) | ... | (xb10, yb10, zb10) |
| POSE OF RAISING ARM | (xc1, yc1, zc1) | (xc2, yc2, zc2) | ... | (xc10, yc10, zc10) |
| STANDING POSTURE | (xd1, yd1, zd1) | (xd2, yd2, zd2) | ... | (xd10, yd10, zd10) |
| ... | ... | ... | ... | ... |

INFORMATION PROCESSING APPARATUS AND METHOD FOR EXTRACTING AND CATEGORIZING POSTURES OF HUMAN FIGURES

BACKGROUND OF THE INVENTION

1. Field of the Invention

The present invention relates to information processing apparatuses, information processing methods, and programs. More specifically, the present invention relates to an information processing apparatus, an information processing method, and a program allowing users to more surely and more easily take images of a subject in a specific pose.

2. Description of the Related Art

Recently, it has been studied to automatically record an image of a subject in accordance with a pose of a person serving as the subject while the image of the person is being captured with image-capturing-function attached electronic devices, such as digital cameras and mobile phones.

For example, there is a related art for comparing a feature point of a skin color region extracted from a captured image with a feature point of a pose image set in advance and recording the image if the corresponding feature points match or are similar (see, for example, Japanese Unexamined Patent Application Publication No. 2008-263422).

SUMMARY OF THE INVENTION

A method disclosed in Japanese Unexamined Patent Application Publication No. 2008-263422 allows image capturing to be performed after recognition of a shape of hand, such as a victory sign, based on a feature point of a skin color region. However, capturing images after recognition of a pose of an entire body is difficult with the method unless the skin color region can be extracted regarding the entire body.

In view of such a circumstance, the present invention allows users to more surely and more easily take images of a subject in a specific pose.

An information processing apparatus according to an embodiment of the present invention includes image pickup means capturing an image of a subject, extracting means extracting a human figure from the captured image of the subject captured by the image pickup means, estimating means estimating a posture of the human figure extracted by the extracting means, categorizing means categorizing the posture of the human figure estimated by the estimating means into a previously prepared pose, and recording control means controlling recording of the captured image on the basis of the pose that the posture of the human figure is categorized into by the categorizing means.

The recording control means may control recording of the captured image in a case where the pose that the posture of the human figure is categorized into by the categorizing means is a previously decided recording pose for recording the captured image.

The recording control means may control recording of the captured image in a case where a plurality of human figures are extracted by the extracting means and at least some of the poses that the postures of the plurality of human figures are categorized into by the categorizing means are the same recording pose.

The information processing apparatus may further include mode setting means setting an image capturing mode in accordance with the pose that the posture of the human figure is categorized into by the categorizing means. The recording control means may control recording of the captured image in the image capturing mode set by the mode setting means in a case where the pose is the recording pose.

The information processing apparatus may further include comparing means comparing the posture of the human figure estimated by the estimating means between frames and shutter speed setting means setting shutter speed in image capturing of the image pickup means in accordance with a change in the posture of the human figure between the frames compared by the comparing means.

An information processing method according to an embodiment of the present invention is an image capturing method of an information processing apparatus including image pickup means capturing an image of a subject and includes the steps of extracting a human figure from the captured image of the subject captured by the image pickup means, estimating a posture of the human figure extracted in the processing of extracting, categorizing the posture of the human figure estimated in the processing of estimating into a previously prepared pose, and controlling recording of the captured image on the basis of the pose that the posture of the human figure is categorized into in processing of categorizing.

A program according to an embodiment of the present invention is a program causing a computer to execute image capturing processing of an information processing apparatus including image pickup means capturing an image of a subject. The program causes the computer to execute the processing including the steps of extracting a human figure from the captured image of the subject captured by the image pickup means, estimating a posture of the human figure extracted in the processing of extracting, categorizing the posture of the human figure estimated in the processing of estimating into a previously prepared pose, and controlling recording of the captured image on the basis of the pose that the posture of the human figure is categorized into in the processing of categorizing.

In accordance with an embodiment of the present invention, a human figure is extracted from a captured image of a subject. A posture of the extracted human figure is estimated. The estimated posture of the human figure is categorized into a previously prepared pose. Recording of the captured image is controlled on the basis of the pose that the posture of the human figure is categorized into.

An embodiment of the present invention allows users to more surely and more easily take images of a subject in a specific pose.

BRIEF DESCRIPTION OF THE DRAWINGS

FIG. 1 is a block diagram illustrating an example of a functional configuration of an image capturing apparatus serving as one embodiment of an information processing apparatus that the present invention is applied to;

FIG. 5 is a diagram describing a learning dictionary;

DESCRIPTION OF THE PREFERRED EMBODIMENTS

Embodiments of the present invention will be described below with reference to the attached drawings. Meanwhile, the description will be given in an order as follows:

1. First embodiment (an example case of one subject);
2. Second embodiment (an example case of a plurality of subjects);
3. Third embodiment (an example of setting an image capturing mode in accordance with a pose); and
4. Fourth embodiment (an example of setting shutter speed in accordance with movement of a subject).

<1. First Embodiment>

[About Example of Functional Configuration of Image Capturing Apparatus]

Figure 1:
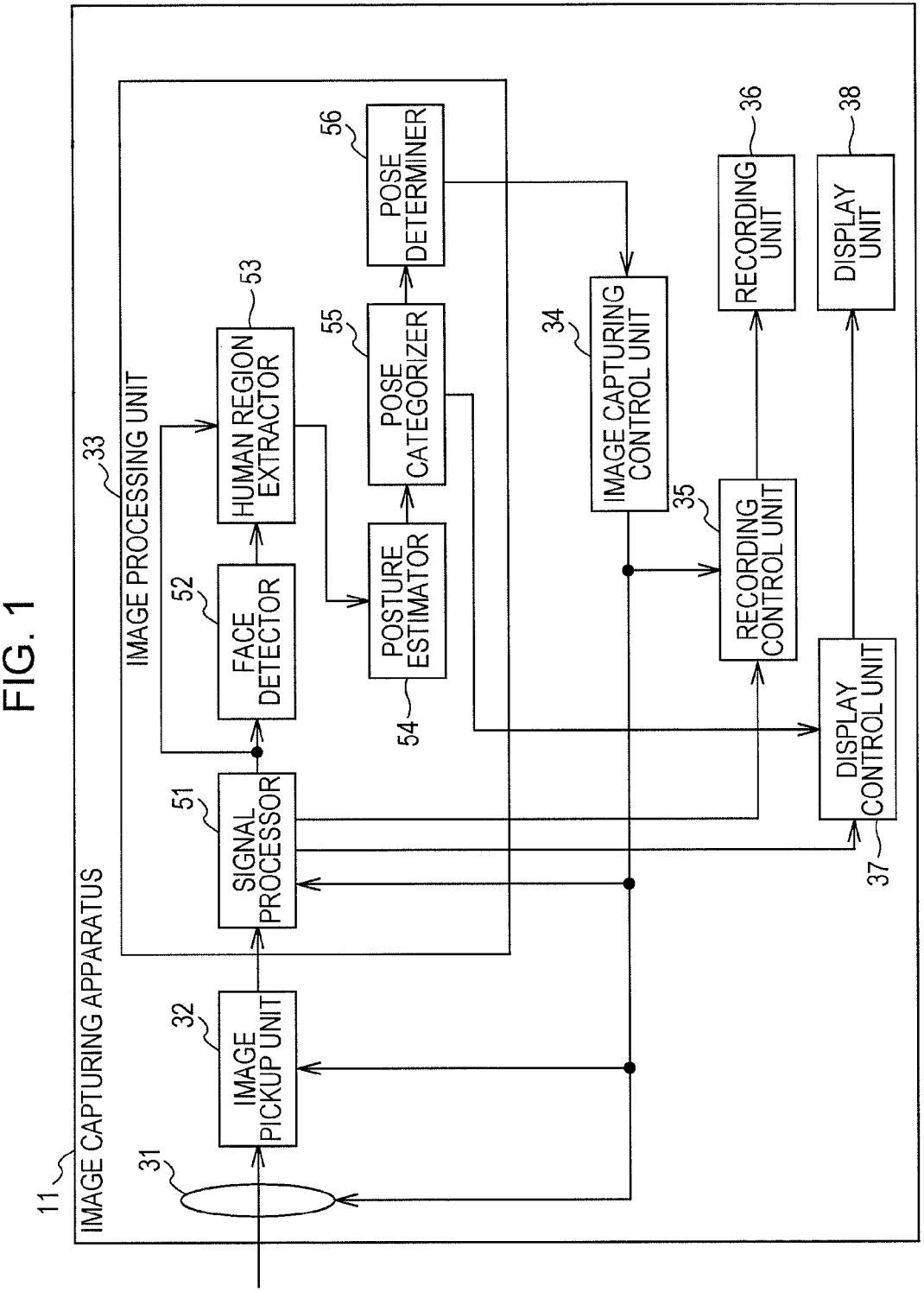

FIG. 1 illustrates an example of a functional configuration of an image capturing apparatus serving as an embodiment of an information processing apparatus that the present invention is applied to.

An image capturing apparatus 11 illustrated in FIG. 1 may be apparatuses, such as a digital camera and an image-capturing-function attached mobile phone.

The image capturing apparatus 11 illustrated in FIG. 1 includes an optical unit 31, an image pickup unit 32, an image processing unit 33, an image capturing control unit 34, a recording control unit 35, a recording unit 36, a display control unit 37, and a display unit 38.

The optical unit 31 includes optical elements, such as a lens, an iris, and a mechanical shutter, and adjusts a focal position and exposure. At the time of image capturing, the optical unit 31 passes light incoming outside of the image capturing apparatus 11 and supplies the light to the image pickup unit 32.

The image pickup unit 32 includes a photoelectric element, such as a charge coupled device (CCD) or a complementary metal oxide semiconductor (CMOS) sensor. The image pickup unit 32 converts the incident light (i.e., a captured image) supplied through the optical unit 31 into electronic data with the photoelectric element thereof to generate image data of the captured image. The image pickup unit 32 supplies the generated image data to the image processing unit 33.

The image processing unit 33 performs predetermined image processing on the image data supplied from the image pickup unit 32. The image processing unit 33 supplies the processed image data to the recording unit 36 through the recording control unit 35 to store the image data and also supplies the image data to the display unit 38 through the display control unit 37 to display an image thereof. Additionally, the image processing unit 33 supplies the image capturing control unit 34 with information for controlling image capturing performed in the image capturing apparatus 11 resulting from the image processing.

The image processing unit 33 includes a signal processor 51, a face detector 52, a human region extractor 53, a posture estimator 54, a pose categorizer 55, and a pose determiner 56.

The signal processor 51 performs, on the image data supplied from the image pickup unit 32, image processing, such as white balance adjustment processing, de-mosaic processing, tone correction processing, gamma correction processing, and YC conversion processing. The signal processor 51 supplies the processed image data (hereinafter, referred to as a captured image) to the face detector 52, the human region extractor 53, the recording control unit 35, and the display control unit 37.

The face detector 52 detects a face from the image data (i.e., the captured image) supplied from the signal processor 51 and supplies position information representing a position of the detected face to the human region extractor 53.

The human region extractor 53 extracts a human region, i.e., a region of a human figure in the captured image, on the basis of the position information supplied from the face detector 52 and supplies the extracted human region to the posture estimator 54.

The posture estimator 54 estimates a posture of the human figure in the human region supplied from the human region extractor 53 and supplies posture information representing the posture to the pose categorizer 55.

The pose categorizer 55 categorizes the posture of the human figure in the captured image into one of poses prepared in advance on the basis of the posture information supplied from the posture estimator 54. The pose categorizer 55 supplies the pose determiner 56 with pose information representing the pose that the posture of the human figure in the captured image is categorized into.

The pose determiner 56 determines whether the pose represented by the pose information supplied from the pose categorizer 55 is a predetermined shutter pose for recording the captured image. If the pose represented by the pose information supplied from the pose categorizer 55 is the shutter pose, the pose determiner 56 supplies the image capturing control unit 34 with information for instructing recording of the captured image.

The image capturing control unit 34 controls the optical unit 31, the image pickup unit 32, the recording control unit 35, and the signal processor 51, thereby realizing an image capturing function in the image capturing apparatus 11. The image capturing control unit 34 controls recording of the captured image in the recording unit 36 through the recording control unit 35 on the basis of the information supplied from the pose determiner 56.

The recording control unit 35 controls recording in the recording unit 36 on the basis of the control of the image capturing control unit 34 to record the captured image supplied from the signal processor 51 in the recording unit 36.

The display control unit 37 controls display on the display unit 38 to display the captured image supplied from the signal processor 51 on the display unit 38.

[About Image Capturing Processing of Image Capturing Apparatus]

Figure 2:
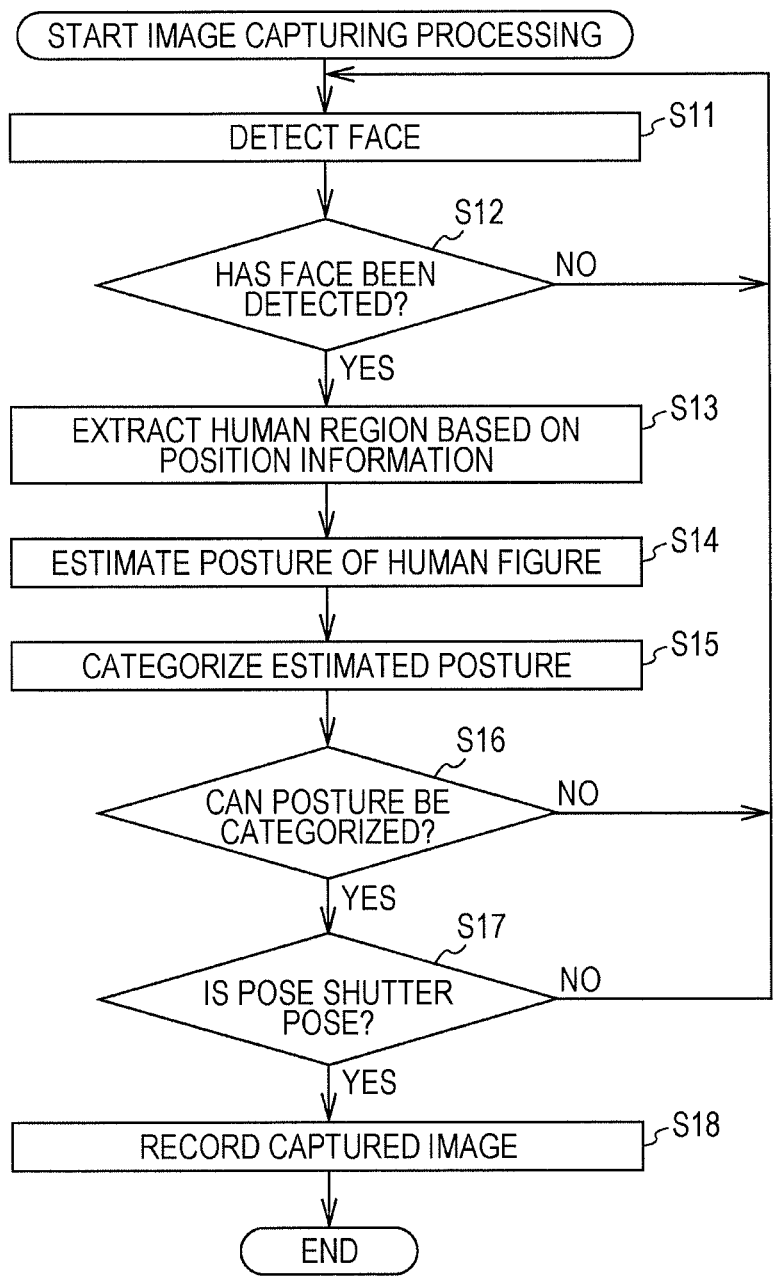
FIG. 2 is a flowchart describing image capturing processing.

Image capturing processing of the image capturing apparatus 11 illustrated in FIG. 1 will now be described with reference to a flowchart in FIG. 2. The image capturing processing illustrated in FIG. 2 is executed every time the signal processor 51 performs the image processing on the image data supplied from the image pickup unit 32 on a frame-by-frame basis.

In STEP S11, the face detector 52 detects a face of a human figure from a predetermined frame of the captured image (i.e., image data) supplied from the signal processor 51. For example, the face detector 52 has learned face images of faces in various directions, thereby detecting a human face from the captured image.

In STEP S12, the face detector 52 determines whether the face has been detected. If it is determined in STEP S12 that the face has not been detected, the process returns to STEP S11. The face detector 52 repeats the processing in STEPs S11 and S12 until a frame in which one face is detected is supplied from the signal processor 51.

On the other hand, if it is determined in STEP S12 that the face has been detected, the face detector 52 supplies the human region extractor 53 with position information representing a position of the detected face. Here, the position information may be, for example, coordinates of upper left and lower right apices of a rectangular region detected as a region of the face. Meanwhile, the position information at least allows the position of the face in the captured image to be specified between frames of the captured image.

In STEP S13, the human region extractor 53 extracts a human region serving as a region of the human figure in the predetermined frame of the captured image on the basis of the position information supplied from the face detector 52 and supplies the extracted human region to the posture estimator 54. More specifically, the human region extractor 53 estimates a position of an upper half part of the human figure based on the position of the face represented by the position information supplied from the face detector 52 and extracts a region of the face and the estimated upper half part in the captured image as the human region.

In STEP S14, the posture estimator 54 estimates a posture of the human figure in the human region supplied from the human region extractor 53.

Posture estimation by the posture estimator 54 will now be described with reference to FIGS. 3 and 4.

Figure 3:
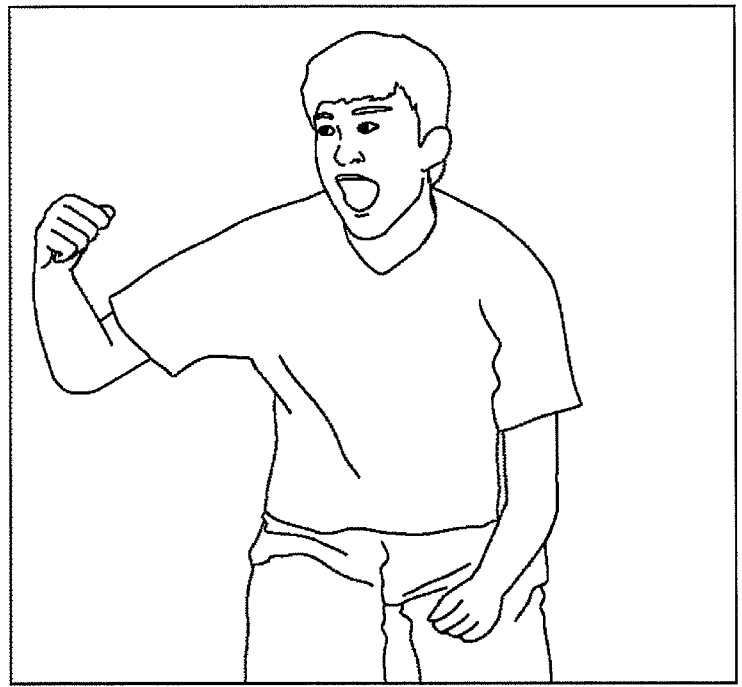
FIG. 3 is a diagram describing an example of a human region.

FIG. 3 illustrates a human region extracted from a predetermined frame of a captured image. Referring to FIG. 3, a region of a face and an upper half part of a human figure thrusting their fist is extracted as the human region.

Generally, a human body is a multi-jointed body that has a plurality of joints and changes in various shapes. A body segment part connecting the joints can be considered as a rigid body. Thus, a human body can be represented by determining an angle (hereinafter, referred to as a joint angle) between two body segments connected to one joint in a model constituted by connecting body segments each other through joints.

Figure 4:
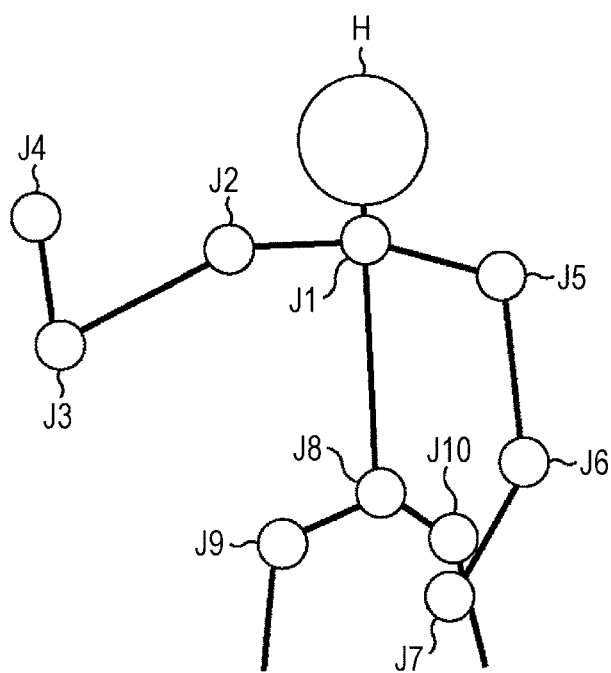
FIG. 4 is a diagram describing posture estimation.

Accordingly, when the human region illustrated in FIG. 3 is extracted, the posture estimator 54 specifies each joint in the upper half part of the human figure thrusting their fist and determines the joint angle regarding each joint, thereby generating a three-dimensional human body model illustrated in FIG. 4 and estimating a posture of the upper half part of the human figure.

The three-dimensional human body model illustrated in FIG. 4 is represented with a head H, joints J1 to J10, and body segments connecting each joint. Referring to FIG. 4, the joint J1, the joint J2, the joint J3, the joint J4, the joint J5, the joint J6, the joint J7, the joint J8, the joint J9, and the joint J10 represent a neck, a right shoulder, a right elbow, a right wrist, a left shoulder, a left elbow, a left wrist, a lower back, a right groin, and a left groin, respectively, to correspond the upper half part of the human figure illustrated in FIG. 3.

The posture estimator 54 then supplies the pose categorizer 55 with three-dimensional-space coordinates (hereinafter, referred to as joint coordinates) of each joint of the three-dimensional human body model generated in this way as the posture information representing the posture of the upper half part of the human figure.

Referring back to the flowchart in FIG. 2, in STEP S15, the pose categorizer 55 determines which of the poses registered in an internally held learning dictionary matches the posture of the human figure in the captured image on the basis of the posture information supplied from the posture estimator 54, thereby categorizing the estimated posture.

More specifically, as illustrated in FIG. 5, the learning dictionary held in the pose categorizer 55 stores poses, such as a pose of thrusting one's fist, a pose of raising arms, a pose of raising an arm, a standing posture, in association with the joint coordinates of each of the above-described joints J1 to J10.

In accordance with FIG. 5, for example, the pose of thrusting one's fist is a posture for which the joints J1 to J10 are located at coordinates (xa1, ya1, za1), (xa2, ya2, za2), ..., (xa10, ya10, za10) in the three-dimensional space (e.g., a xyz space), respectively. Additionally, for example, the pose of raising arms is a posture for which the joints J1 to J10 are located at coordinates (xb1, yb1, zb1), (xb2, yb2, zb2), ..., (xb10, yb10, zb10) in the three-dimensional space (e.g., the xyz space), respectively.

In STEP S16, the pose categorizer 55 determines whether the posture estimated by the posture estimator 54 is a posture that can be categorized. More specifically, the pose categorizer 55 determines whether joint coordinates close to each joint coordinates serving as the posture information supplied from the posture estimator 54 are registered in the learning dictionary illustrated in FIG. 5.

If it is determined in STEP S16 that the posture estimated by the posture estimator 54 is not a posture that can be categorized, i.e., if the joint coordinates close to each joint coordinates serving as the posture information supplied from the posture estimator 54 are not registered, the process returns to STEP S11 and the processing is executed on the next frame. Meanwhile, at this time, the pose categorizer 55 may supply the display control unit 37 with information indicating that the estimated posture is not categorizable. In this case, the display control unit 37 causes the display unit 38 to display that the estimated posture is not categorizable.

On the other hand, if it is determined in STEP S16 that the posture estimated by the posture estimator 54 is a posture that can be categorized, i.e., if the joint coordinates close to each joint coordinates serving as the posture information supplied from the posture estimator 54 are registered in the learning dictionary, the pose categorizer 55 supplies the pose determiner 56 with pose information representing the pose associated with the joint coordinates.

In STEP S17, the pose determiner 56 determines whether the pose represented by the pose information supplied from the pose categorizer 55 is a shutter pose.

The shutter pose is a pose set in advance by the user from the poses registered in the learning dictionary held in the pose categorizer 55, for example.

If it is determined in STEP S17 that the pose represented by the pose information supplied from the pose categorizer 55 is not the shutter pose, the process returns to STEP S11 and the processing is executed on the next frame.

On the other hand, if it is determined in STEP S17 that the pose represented by the pose information supplied from the pose categorizer 55 is the shutter pose, the pose determiner 56 supplies recording instruction information instructing recording of the captured image to the image capturing control unit 34 together with shutter pose information representing the shutter pose.

In STEP S18, the image capturing control unit 34 causes the recording control unit 35 to control recording of the captured image in the recording unit 36 on the basis of the recording instruction information supplied from the pose determiner 56. At this time, the image capturing control unit 34 causes the captured image to be recorded in the recording unit 36 together with the shutter pose information supplied from the poser determiner 56.

In accordance with the foregoing processing, the posture of the human figure serving as the subject is estimated. If the estimated posture is categorized into a predetermined pose and the predetermined pose is the shutter pose, the captured image can be recorded. That is, since the captured image is recorded if the pose taken by the subject is registered in the learning dictionary and the pose is set as the shutter pose, an image taker can more surely and more easily take images of the subject in the specific pose without being conscious of the pose taken by the subject.

Additionally, since the shutter pose information representing the shutter pose is recorded with the captured image, a user can categorize and retrieve the captured image based on the shutter pose information when organizing a plurality of captured images recorded in the recording unit 36.

Although the image capturing processing in the case of one subject human figure has been described above, image capturing processing in a case of a plurality of subject human figures will be described below.

<2. Second Embodiment>
[About Example of Another Functional Configuration of Image Capturing Apparatus]

Figure 6:
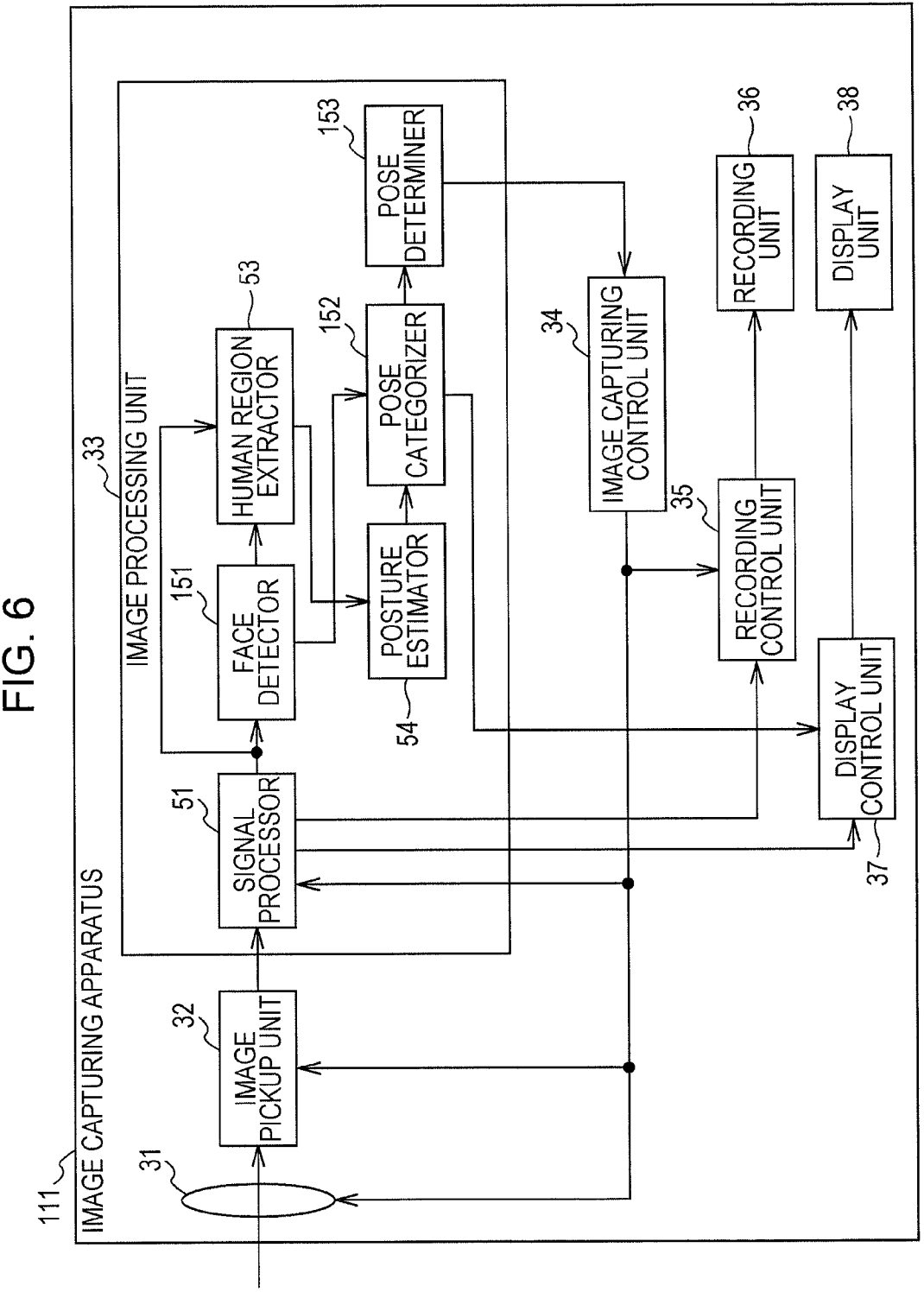
FIG. 6 is a block diagram illustrating an example of another functional configuration of an image capturing apparatus.

FIG. 6 illustrates an example of another functional configuration of an image capturing apparatus that the present invention is applied to.

An image capturing apparatus 111 illustrated in FIG. 6 includes an optical unit 31, an image pickup unit 32, an image processing unit 33, an image capturing control unit 34, a recording control unit 35, a recording unit 36, a display control unit 37, and a display unit 38. Additionally, the image processing unit 33 illustrated in FIG. 6 includes a signal processor 51, a human region extractor 53, a posture estimator 54, a face detector 151, a pose categorizer 152, and a pose determiner 153.

Meanwhile, in the image capturing apparatus 111 illustrated in FIG. 6, the same name and the same reference sign are attached to a configuration having a function similar to that provided in the image capturing apparatus 11 illustrated in FIG. 1 and a description thereof is omitted accordingly.

That is, the image capturing apparatus 111 in FIG. 6 differs from the image capturing apparatus 11 in FIG. 1 in that the face detector 151, the pose categorizer 152, and the pose determiner 153 are provided in the image processing unit 33 instead of the face detector 52, the pose categorizer 55, and the pose determiner 56, respectively.

The face detector 151 detects a plurality of faces from image data (i.e., a captured image) supplied from the signal processor 51 and supplies the human region extractor 53 with position information representing positions of the detected faces. Additionally, the face detector 151 supplies the pose categorizer 152 with information representing the number of detected faces.

The pose categorizer 152 categorizes postures of a plurality of human figures in the captured image into one of poses prepared in advance on the basis of posture information supplied from the posture estimator 54. The pose categorizer 152 supplies the pose determiner 153 with pose information representing poses that the postures of the plurality of human figures in the captured image are categorized into.

The pose determiner 153 determines whether the plurality of poses represented by the pose information supplied from the pose categorizer 152 are the same shutter pose. If the plurality of poses represented by the pose information supplied from the pose categorizer 152 are the same shutter pose, the pose determiner 153 supplies information instructing recording of the captured image to the image capturing control unit 34.

[About Image Capturing Processing of Image Capturing Apparatus]

Figure 7:
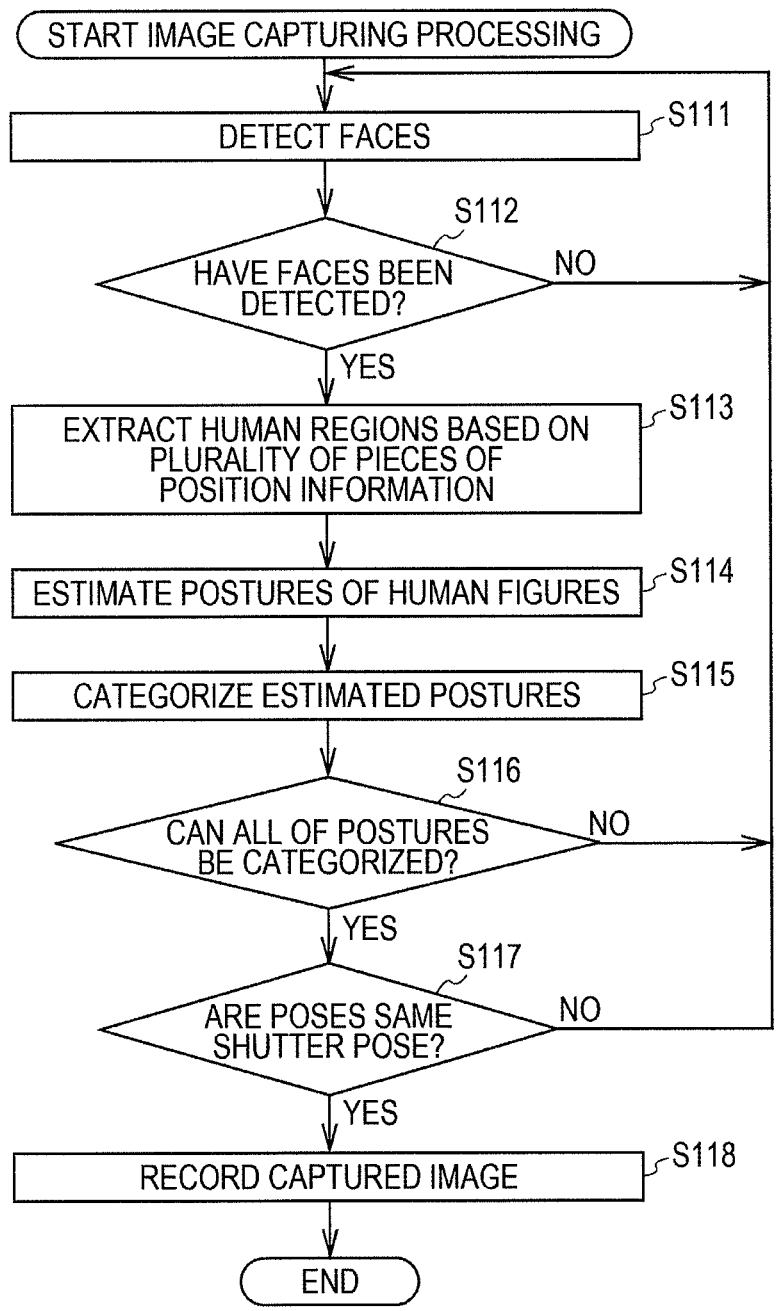
FIG. 7 is a flowchart describing image capturing processing of the image capturing apparatus illustrated in FIG. 6.

Image capturing processing of the image capturing apparatus 111 illustrated FIG. 6 will now be described with reference to a flowchart in FIG. 7. The image capturing processing illustrate in FIG. 7 is executed every time the signal processor 51 performs image processing on image data supplied from the image pickup unit 32 on a frame-by-frame basis.

In STEP S111, the face detector 151 detects a plurality of faces of human figures from a predetermined frame of a captured image (i.e., image data) supplied from the signal processor 51.

In STEP S112, the face detector 151 determines whether the faces have been detected. If it is determined in STEP S112 that no face has been detected, the process returns to STEP S111 and the face detector 151 repeats the processing in STEPs S111 and S112 until a frame in which the faces are detected is supplied from the signal processor 51.

On the other hand, if it is determined in STEP S112 that the faces have been detected, the face detector 151 supplies the human region extractor 53 with position information representing positions of one or more detected faces. Additionally, the face detector 151 supplies the pose categorizer 152 with information representing the number of detected faces.

In STEP S113, the human region extractor 53 extracts a human region serving as a region of the human figure in the predetermined frame of the captured image on the basis of the position information supplied from the face detector 52 and supplies the extracted human region to the posture estimator 54. Here, as many human regions as the number of detected faces are extracted.

In STEP S114, the posture estimator 54 estimates a posture of the human figure in the human region supplied from the human region extractor 53 as described with reference to FIGS. 3 and 4. The posture estimator 54 supplies the pose categorizer 152 with as many pieces of posture information representing the estimated posture as the number of faces detected by the face detector 151.

In STEP S115, the pose categorizer 152 determines whether each of the postures of the plurality of human figures in the captured image matches one of poses registered in a learning dictionary held therein on the basis of the posture information supplied from the posture estimator 54, thereby categorizing the postures estimated for the plurality of human figures.

In STEP S116, the pose categorizer 152 determines whether the postures estimated by the posture estimator 54 for the plurality of human figures are postures that can be categorized on the basis of the information representing the number of faces supplied from the face detector 151.

If it is determined in STEP S116 that some of the postures estimated by the posture estimator 54 for the plurality of human figures are not the postures that can be categorized, i.e., if the number of categorizable postures is less than the number of faces represented by the information supplied from the face detector 151, the process returns to STEP S111 and the processing is performed on the next frame. Additionally, at this time, the pose categorizer 152 may supply the display control unit 37 with information indicating that some of the postures estimated for the plurality of human figures are not categorizable. In this case, the display control unit 37 causes the display unit 38 to display that some of the estimated postures are not categorizable.

On the other hand, if it is determined in STEP S116 that the postures estimated by the posture estimator 54 are postures that can be categorized, i.e., if the number of categorizable postures matches the number of faces represented by the information supplied from the face detector 151, the pose categorizer 152 supplies the pose determiner 153 with pose information representing a pose that each posture is categorized into.

In STEP S117, the pose determiner 153 determines whether the plurality of poses represented by the pose information supplied from the pose categorizer 152 are the same shutter pose.

If it is determined in STEP S117 that the plurality of poses represented by the pose information supplied from the pose categorizer 152 are not the same shutter pose, i.e., if one of the plurality of poses is a shutter pose different from the others or is not the set shutter pose, the process returns to STEP S111 and the processing is performed on the next frame.

On the other hand, if it is determined in STEP S117 that the plurality of poses represented by the pose information supplied from the pose categorizer 152 are the same shutter pose, the pose determiner 153 supplies the image capturing control unit 34 with recording instruction information instructing recording of the captured image and shutter pose information representing the shutter pose.

In STEP S118, the image capturing control unit 34 causes the recording control unit 35 to control recording of the captured image in the recording unit 36 on the basis of the recording instruction information supplied from the pose determiner 153. At this time, the image capturing control unit 34 causes the recording unit 36 to record the captured image together with the shutter pose information supplied from the pose determiner 153.

In accordance with the foregoing processing, the postures of the plurality of human figures serving as the subjects are estimated. If the postures estimated for the plurality of human figures are categorized into predetermined poses and the poses are the same shutter pose, the captured image can be recorded. That is, the captured image is recorded if the poses taken by the plurality of subjects are registered in the learning dictionary and the poses are set as the shutter poses and if the poses taken by the plurality of subjects are the same. Thus, an image taker can more surely and more easily take images of the plurality of subjects in the poses without being conscious of the poses taken by the plurality of subjects when the poses taken by the plurality of subjects match.

Additionally, since the shutter pose information representing the shutter pose is recorded with the captured image, a user can categorize and retrieve the captured image based on the shutter pose information when organizing a plurality of captured images recorded in the recording unit 36.

Meanwhile, in the foregoing description, the pose categorizer 152 supplies the pose information to the pose determiner 153 when the number of categorizable postures matches the number of detected faces in STEP S116. However, for example, the pose information may be supplied to the pose determiner 153 when the number of categorizable postures matches a value resulting from subtraction of a predetermined value, such as 2 or 3, from the number of detected faces.

In addition, the pose determiner 153 supplies the recording instruction information to the image capturing control unit 34 when the plurality of poses are the same shutter pose in STEP S117. However, when it is determined that, for example, 80% of the plurality of poses are the same shutter pose, the recording instruction information may be supplied to the image capturing control unit 34.

Accordingly, if the poses taken by the plurality of subjects are not the same but the poses taken by the plurality of subjects match to some degree, the captured image of the subjects can be recorded.

Although the processing for recording the captured image of the subjects in accordance with the poses taken by the subjects has been described above, the captured image of the subject can be recorded after an image capturing mode is set in accordance with the pose taken by the subject.

<3. Third Embodiment>

[About Example of Another Functional Configuration of Image Capturing Apparatus]

Figure 8:
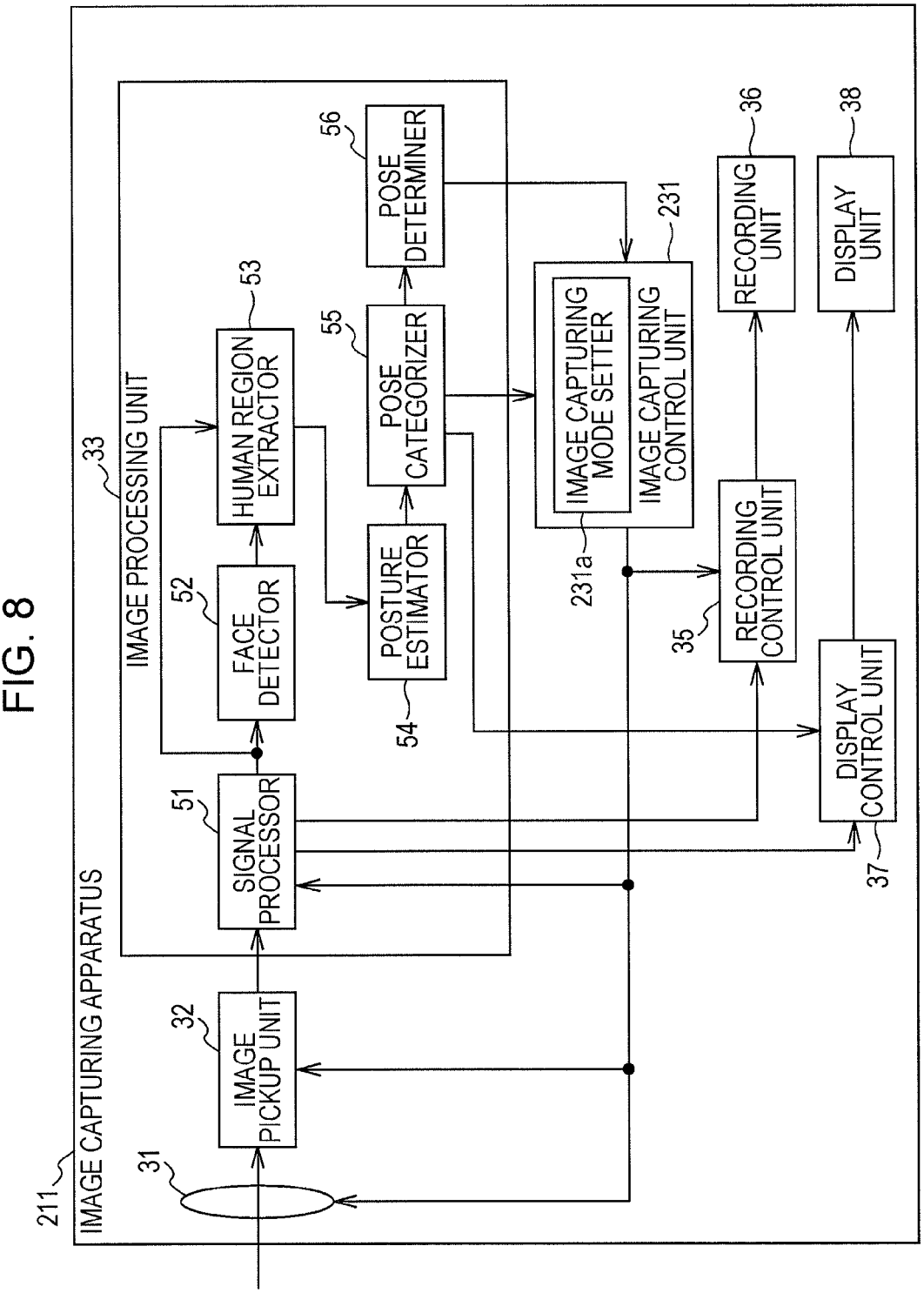
FIG. 8 is a block diagram illustrating an example of a still another functional configuration of an image capturing apparatus.

FIG. 8 illustrates an example of a functional configuration of an image capturing apparatus that records a captured image of a subject after setting an image capturing mode in accordance with a pose taken by the subject.

An image capturing apparatus 211 illustrated in FIG. 8 includes an optical unit 31, an image pickup unit 32, an image processing unit 33, a recording control unit 35, a recording unit 36, a display control unit 37, a display unit 38, and an image capturing control unit 231.

Meanwhile, in the image capturing apparatus 211 illustrated in FIG. 8, the same name and the same reference sign are attached to a configuration having a function similar to that provided in the image capturing apparatus 11 illustrated in FIG. 1 and a description thereof is omitted accordingly.

That is, the image capturing apparatus 211 in FIG. 8 differs from the image capturing apparatus 11 in FIG. 1 in that the image capturing control unit 231 is provided instead of the image capturing control unit 34.

Additionally, a pose categorizer 55 illustrated in FIG. 8 supplies a pose determiner 56 and the image capturing control unit 231 with pose information representing a pose that a posture of a human figure in a captured image is categorized into.

The image capturing control unit 231 has a function similar to that of the image capturing control unit 34 illustrated in FIG. 1 and also includes an image capturing mode setter 231a. The image capturing mode setter 231a sets an image capturing mode on the basis of the pose information supplied from the pose categorizer 55 and supplies information representing the set image capturing mode to the optical unit 31, the image pickup unit 32, and a signal processor 51.

[About Image Capturing Processing of Image Capturing Apparatus]

Figure 9:
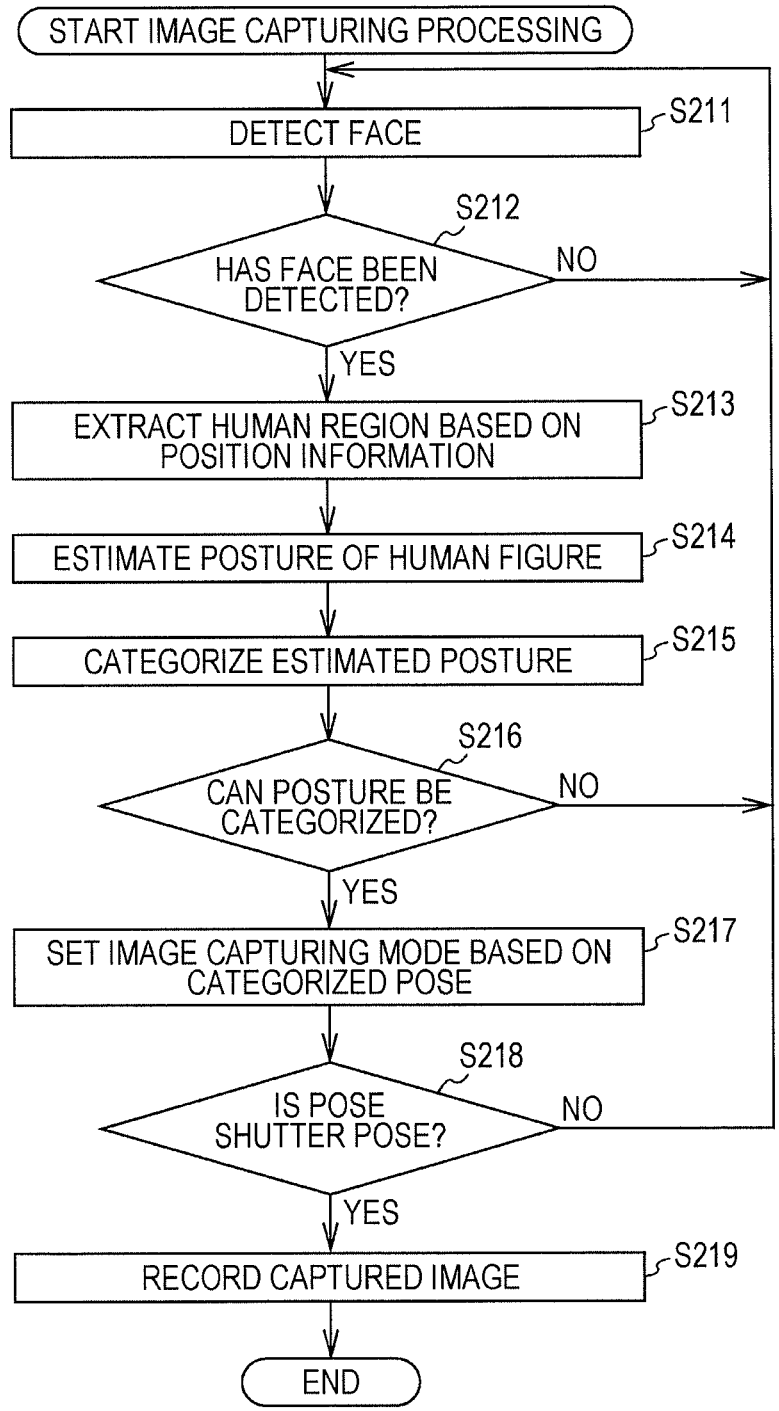
FIG. 9 is a flowchart describing image capturing processing of the image capturing apparatus illustrated in FIG. 8.

Image capturing processing of the image capturing apparatus 211 illustrated in FIG. 8 will now be described with reference to a flowchart illustrated in FIG. 9. Meanwhile, since processing in STEPs S211 to S216, S218, and S219 in the flowchart in FIG. 9 is similar to processing in STEPs S11 to 18 having been described with reference to the flowchart in FIG. 2, a description thereof is omitted.

Additionally, if it is determined in STEP S216 that a posture estimated by a posture estimator 54 is a posture that can be categorized, the pose categorizer 55 supplies the pose determiner 56 and the image capturing control unit 231 with pose information representing a pose that the posture is categorized into.

In STEP S217, the image capturing mode setter 231a of the image capturing control unit 231 sets an image capturing mode corresponding to the pose represented by the pose information on the basis of the pose information supplied from the pose categorizer 55.

The image capturing mode setter 231a holds correspondence information associating various poses with scene modes, serving as the image capturing modes, for performing image capturing corresponding to an environment in which the subject exits. The scene modes include, for example, a human mode for enhancing a human figure so that a skin color is imaged beautifully, a sport mode for capturing a subject moving fast, a landscape mode for focusing in the distance so that the image is captured sharply, a self shooting mode for correcting motion blurring so that a skin color is imaged beautifully.

Additionally, the pose and the scene mode are associated in the correspondence information in a manner, such as a pose of thrusting one's fist and the sport mode, and a pose of raising arms and the landscape mode.

The image capturing mode setter 231a supplies the optical unit 31, the image pickup unit 32, and the signal processor 51 with mode information representing the scene mode associated with the pose represented by the pose information supplied from the pose categorizer 55 on the basis of the correspondence information.

In this way, image capturing parameters are adjusted in the optical unit 31 and the image pickup unit 32 and predetermined image processing is performed in the signal processor 51 so that a captured image corresponding to the scene mode represented by the mode information is obtained.

For example, when a pose of extending the right hand towards the image capturing apparatus 211 is registered in a learning dictionary and the pose is set as a shutter pose, shutter timing can be delayed by in advance preparing the correspondence information associating the pose with the self capturing mode.

In accordance with the foregoing processing, the posture of the human figure serving as the subject is estimated. If the posture estimated for the human figure is categorized into a predetermined pose, the captured image can be recorded in the image capturing mode (i.e., the scene mode) corresponding to the pose. That is, if the pose taken by the subject is registered in the learning dictionary and the pose is set as the shutter pose, the captured image is recorded in the scene mode corresponding to the pose. Thus, an image taker can more surely and more easily take images of the subject in the pose without being conscious of the pose taken by the subject and without setting the scene mode that is generally manually set through an operation, such as a dial operation.

Although the processing for recording the captured image of the subject after setting the image capturing mode in accordance with the pose taken by the subject has been described above, the captured image of the subject can be recorded in accordance with the pose taken by the subject after setting shutter speed on the basis of an estimated posture change.

<4. Fourth Embodiment>

[About Example of Another Functional Configuration of Image Capturing Apparatus]

Figure 10:
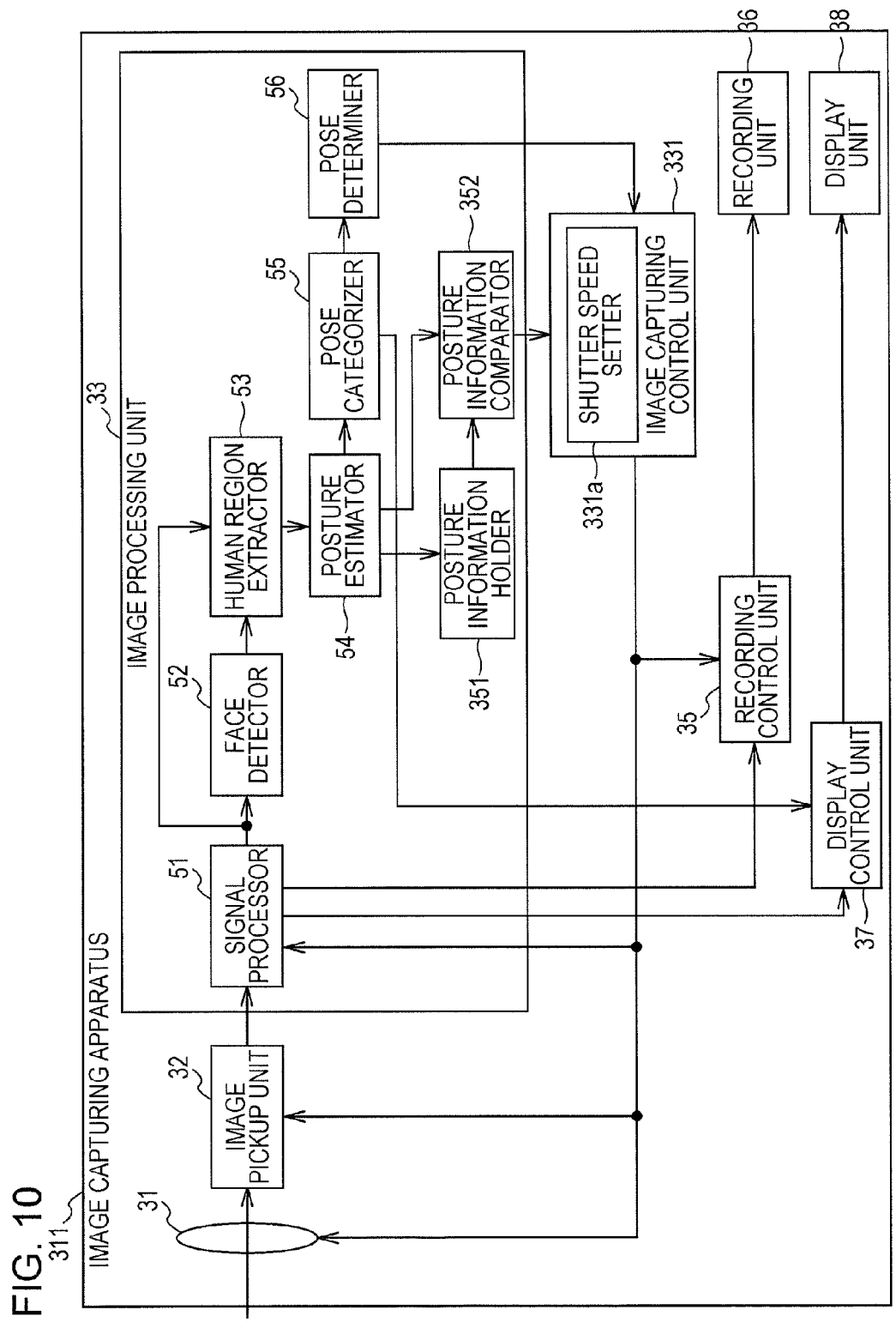
FIG. 10 is a block diagram illustrating an example of a still another functional configuration of an image capturing apparatus.

FIG. 10 illustrates an example of a functional configuration of an image capturing apparatus that records a captured image of a subject in accordance with a pose taken by the subject after setting shutter speed on the basis of an estimated posture change.

An image capturing apparatus 311 illustrated in FIG. 10 includes an optical unit 31, an image pickup unit 32, an image processing unit 33, a recording control unit 35, a recording unit 36, a display control unit 37, a display unit 38, and an image capturing control unit 331. Additionally, the image processing unit 33 illustrated in FIG. 10 includes a signal processor 51, a face detector 52, a human region extractor 53, a posture estimator 54, a pose categorizer 55, a pose determiner 56, a posture information holder 351, and a posture information comparator 352.

Meanwhile, in the image capturing apparatus 311 illustrated in FIG. 10, the same name and the same reference sign are attached to a configuration having a function similar to that provided in the image capturing apparatus 11 illustrated in FIG. 1 and a description thereof is omitted accordingly.

That is, the image capturing apparatus 311 in FIG. 10 differs from the image capturing apparatus 11 in FIG. 1 in that the image capturing control unit 331 is provided instead of the image capturing control unit 34 and the posture information holder 351 and the posture information comparator 352 are newly provided in the image processing unit 33.

Meanwhile, the posture estimator 54 illustrated in FIG. 10 estimates a posture of a human figure in a human region supplied from the human region extractor 53 and supplies posture information representing the posture to the pose categorizer 55, the posture information holder 351, and the posture information comparator 352.

The posture information holder 351 holds (stores) the posture information for one frame supplied from the posture estimator 54 and supplies the posture information comparator 352 with posture information delayed by one frame.

The posture information comparator 352 compares the posture information supplied from the posture estimator 54 with the posture information of the last frame supplied from the posture information holder 351 and supplies the image capturing control unit 331 with a result of the comparison.

The image capturing control unit 331 has a function similar to that of the image capturing control unit 34 illustrated in FIG. 1 and also includes a shutter speed setter 331a. The shutter speed setter 331a sets shutter speed on the basis of the comparison result of the interframe posture information supplied from the posture information comparator 352 and supplies the optical unit 31 with information representing the set shutter speed.

[About Image Capturing Processing of Image Capturing Apparatus]

Figure 11:
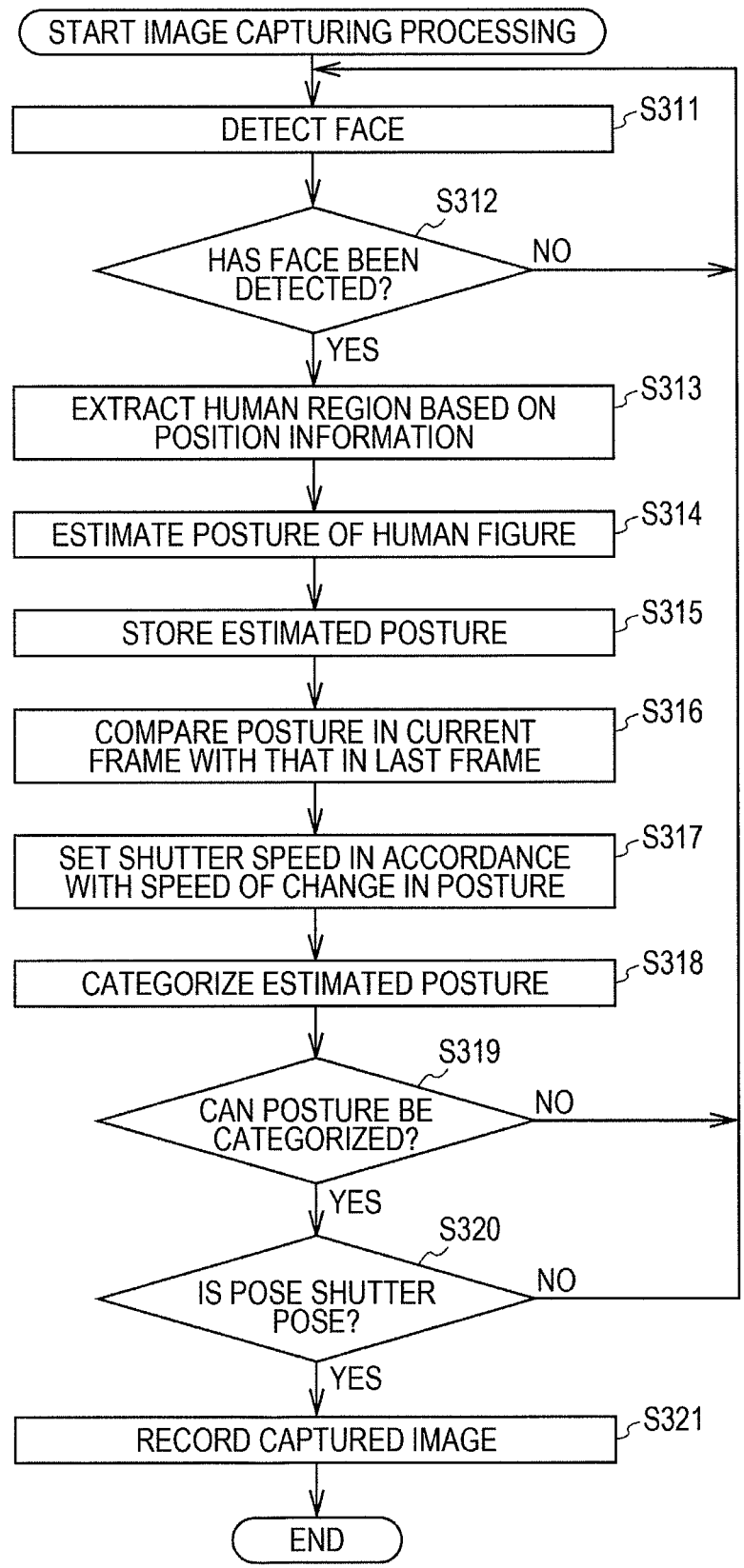
FIG. 11 is a flowchart describing image capturing processing of the image capturing apparatus illustrated in FIG. 10.

Image capturing processing of the image capturing apparatus 311 illustrated in FIG. 10 will now be described with reference to a flowchart illustrated in FIG. 11. Meanwhile, since processing in STEPs S311 to S314 and S318 to S321 in the flowchart in FIG. 11 is similar to the processing in STEPs S11 to S18 having been described with reference to the flowchart in FIG. 2, a description thereof is omitted.

Meanwhile, in STEP S314, the posture estimator 54 estimates a posture of a human figure in a human region supplied from the human region extractor 53 and supplies the pose categorizer 55, the posture information holder 351, and the posture information comparator 352 with posture information representing the estimated posture.

In STEP S315, the posture information holder 351 stores the posture information for one frame supplied from the posture estimator 54 and supplies the posture information comparator 352 with the stored posture information of the last frame.

In STEP S316, the posture information comparator 352 compares the posture information supplied from the posture estimator 54 with the posture information of the last frame supplied from the posture information holder 351. More specifically, the posture information comparator 352 compares joint coordinate serving as the posture information of the current frame with joint coordinates serving as the posture information of the last frame, calculates an average value of an amount of movement of each of corresponding joints in the frames, for example, and supplies the average value to the image capturing control unit 331.

In STEP S317, the shutter speed setter 331a of the image capturing control unit 331 sets shutter speed on the basis of the comparison result of the interframe posture information supplied from the posture information comparator 352. More specifically, the shutter speed setter 331a sets the shutter speed in accordance with the average value of the amount of movement of the respective joints in the frames, i.e., speed of a change in the posture of the human figure, supplied from the posture information comparator 352. That is, the shutter speed setter 331a increases the shutter speed if the average value of the amount of movement of the respective joints in the frames is large, whereas it decreases the shutter speed if the average value of the amount of movement of the respective joints in the frames is small. Shutter speed information representing the set shutter speed is supplied to the optical unit 31.

In this way, exposure time is adjusted in the optical unit 31 so that a captured image corresponding to the speed of the change in the posture of the human figure is obtained.

In accordance with the foregoing processing, the posture of the human figure serving as the subject is estimated. If the posture estimated for the human figure is categorized into a predetermined pose, the captured image can be recorded in the shutter speed corresponding to the change in the estimated posture. That is, if the pose taken by the subject is registered in a learning dictionary and the pose is set as a shutter pose, the captured image is recorded in the shutter speed corresponding to the movement of the subject performed until the subject takes the pose. Thus, an image taker can more surely and more easily take images of the subject taking the pose without being conscious of the pose taken by the subject and the movement of the subject up to that point.

Additionally, the image capturing processing in the case where the number of human figures serving as the subject is one has been described in the flowcharts illustrated in FIG. 9 and FIG. 11. However, image capturing processing in a case of a plurality of subjects can be realized by combining the image capturing apparatus 211 (FIG. 8) and the image capturing apparatus 311 (FIG. 10) with the image capturing apparatus 111 illustrated in FIG. 6.

The above-described series of processing may be executed by hardware or software. When the series of processing is executed by software, a program constituting the software is installed, from a program recording medium, in a computer embedded in dedicated hardware or, for example, a general-purpose personal computer or the like capable of executing various functions by installing various programs therein.

Figure 12:
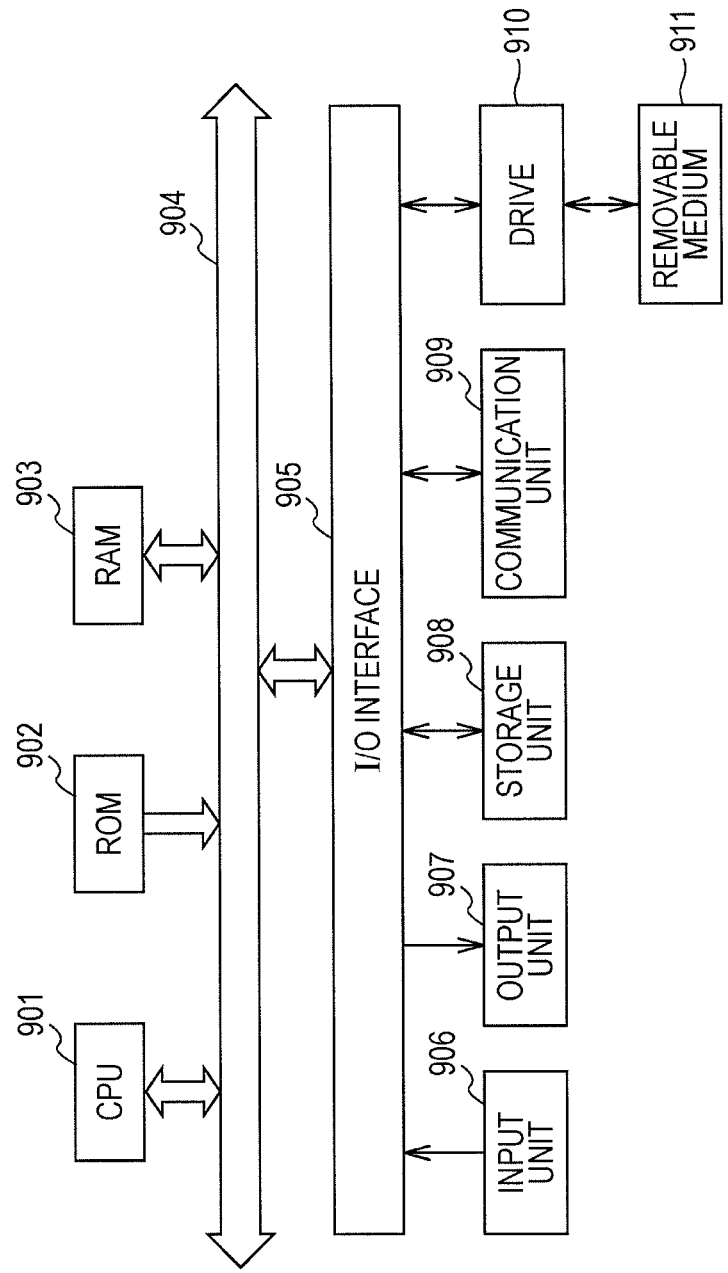
FIG. 12 is a block diagram illustrating an example of a hardware configuration of a computer.

FIG. 12 is a block diagram illustrating an example of a hardware configuration of a computer executing the above-described series of processing by a program.

In the computer, a central processing unit (CPU) 901, a read only memory (ROM) 902, and a random access memory (RAM) 903 are connected to each other through a bus 904.

Furthermore, an input/output (I/O) interface 905 is connected to the bus 904. The I/O interface 905 is connected to an input unit 906, such as a keyboard, a mouse, and a microphone, an output unit 907, such as a display and a speaker, a storage unit 908, such as a hard disk and a nonvolatile memory, a communication unit 909, such as a network interface, and a drive 910 driving a removable medium 911, such as a magnetic disk, an optical disc, a magneto-optical disk, or a semiconductor memory.

In the computer constituted in the foregoing manner, the CPU 901 loads and executes, for example, a program stored in the storage unit 908 to the RAM 903 through the I/O interface 905 and the bus 904, thereby executing the above-described series of processing.

The program executed by the computer (the CPU 901) is provided after being recorded on the removable medium 911 serving as a package medium, such as a magnetic disk (including a flexible disk), an optical disc (such as a compact disc-read only memory (CD-ROM) or a digital versatile disk (DVD)), a magneto-optical disk, or a semiconductor memory, or via a wired or wireless transmission medium, such as a local area network, the Internet, or digital satellite broadcasting.

The program can be then installed in the storage unit 908 through the I/O interface 905 by equipping the drive 910 with the removable medium 911. Additionally, the program can be installed in the storage unit 908 by receiving the program with the communication unit 909 via a wired or wireless transmission medium. Alternatively, the program can be preinstalled in the ROM 902 or the storage unit 908.

Meanwhile, the program executed by the computer may be a program of which processing is chronologically performed in an order described in this specification or may be a program of which processing is performed in parallel or at necessary timing, such as when a call is performed.

Additionally, embodiments of the present invention are not limited to the above-described embodiments and can be variously modified within a scope not departing from the spirit of the present invention.

The present application contains subject matter related to that disclosed in Japanese Priority Patent Application JP 2010-076304 filed in the Japan Patent Office on Mar. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a processor executing a program stored in a memory, and configured to:
received a captured image of a subject;
extract a human region comprising body segments from the captured image of the subject;
estimate a posture of a human figure in the human region, wherein the posture is estimated by determining coordinates of one or more joints connecting the body the body segments of the human figure;
determine an average value of amount of movement of each of the one or more joints across one or more frames of the captured image based on the coordinates of corresponding joints in the one or more frames; and
control recording of the captured image based on the average value of the amount of movement of each of the one or more joints.

2. The information processing apparatus according to claim 1, wherein the processor is configured to categorize the estimated posture of the human figure into one or more predetermined postures and control the recording of the captured image in a case where the one or more predetermined postures into which the estimated posture of the human figure is categorized is a previously determined recording posture for recording the captured image.

3. The information processing apparatus according to claim 2, wherein the processor is configured to control the recording of the captured image in a case where a plurality of human regions are extracted, wherein one or more of the plurality of human figures are categorized into the same recording posture of the one or more predetermined postures.

4. The information processing apparatus according to claim 2, further comprising:
mode setting means setting an image capturing mode in accordance with the pose that the posture of the human figure is categorized into by the categorizing means, wherein the recording control means controls recording of the captured image in the image capturing mode set by the mode setting means in a case where the pose is the recording pose.

5. The information processing apparatus according to claim 2, further comprising:
comparing means comparing the posture of the human figure estimated by the estimating means between frames; and
shutter speed setting means setting shutter speed in image capturing of the image pickup means in accordance with a change in the posture of the human figure between the frames compared by the comparing means.

6. The information processing apparatus according to claim 1, wherein the processor is configured to:
detect one or more faces in the captured image based on face detection, and
determine position information of the detected one or more faces.

7. The information processing apparatus according to claim 6, wherein the extraction of the human region is based on the position information of the detected one or more faces.

8. The information processing apparatus according to claim 6, wherein the position information of the detected one or more faces comprises coordinates of upper left and lower right apices of a rectangular region detected as a region of the detected one or more faces.

9. The information processing apparatus according to claim 1, wherein the processor is configured to provide three-dimensional space coordinates of each joint of a human body model of the human figure as the estimated posture.

10. The information processing apparatus according to claim 1, wherein the processor is configured to categorize the estimated posture of the human figure into one or more predetermined postures, wherein the one or more predetermined postures are stored in a learning dictionary.

11. The information processing apparatus according to claim 1, wherein, when determining that the estimated posture is not categorizable, the processor causes a display unit to display that the estimated posture is not categorizable.

12. An information processing method comprising:
in an information processing apparatus:
capturing an image of a subject;
extracting a human region comprising body segments from the captured image of the subject;
estimating a posture of a human figure in the human region, wherein the posture is estimated by determining coordinates of one or more joints connecting the body segments of the human figure;
determining an average value of amount of movement of each of the one or more joints across one or more frames of the captured image based on the coordinates of corresponding joints in the one or more frames; and
controlling recording of the captured image based on the average value of the amount of movement of each of the one or more joints.

13. A non-transitory computer-readable storage medium having stored thereon, a computer program having at least one code section, the at least one code section being executable by a computer for causing the computer to
extract a human region comprising body segments from a captured image of a subject;
estimate a posture of a human figure in the human region, wherein the posture is estimated by determining coordinates of one or more joints connecting the body segments of the human figure;
determine an average value of amount of movement of each of the one or more joints across one or more frames of the captured image based on the coordinates of corresponding joints in the one or more frames; and
control recording of the captured image based on the average value of the amount of movement of each of the one or more joints.

14. An information processing apparatus, comprising:
a processing unit in an image capturing apparatus, the processing unit executing a program stored in a memory, and configured to:
capture an image of a subject;
extract a human region comprising body segments from the captured image of the subject;
estimate a posture of a human figure in the human region, wherein the posture is estimated by determining coordinates of one or more joints connecting the body segments of the human figure;
determine an average value of amount of movement of each of the one or more joints across one or more frames of the captured image based on the coordinates of corresponding joints in the one or more frames; and
control recording of the captured image based on the average value of the amount of movement of each of the one or more joints.

* * * * *